United States Patent [19]

Fowler

[11] 4,304,326
[45] Dec. 8, 1981

[54] APPARATUS AND METHOD FOR TRANSFORMING A MULTIPLE LAYERED BED OF PIECES INTO A THINNER LAYER

[75] Inventor: David P. Fowler, Irving, Tex.

[73] Assignee: Frito-Lay, Inc., Dallas, Tex.

[21] Appl. No.: 936,777

[22] Filed: Aug. 25, 1978

Related U.S. Application Data

[63] Continuation of Ser. No. 577,843, May 15, 1975.

[51] Int. Cl.$^3$ .............................................. B65G 15/14
[52] U.S. Cl. ..................................... 198/623; 198/604
[58] Field of Search .............. 198/592, 454, 461, 626, 198/627, 628, 604, 605, 623, 638, 459; 241/200; 222/280, 415; 271/34; 414/112, 330, 518; 239/672, 674

[56] References Cited

U.S. PATENT DOCUMENTS

| | | | |
|---|---|---|---|
| 2,021,376 | 11/1935 | Pierce | 241/200 X |
| 2,402,849 | 6/1946 | Sensenig | 198/592 |
| 2,890,493 | 6/1959 | Clark | 241/200 X |
| 3,462,001 | 8/1969 | Boyce | 198/623 X |

FOREIGN PATENT DOCUMENTS 149988  9/1950  Australia ............................. 239/674

*Primary Examiner*—Robert B. Reeves
*Assistant Examiner*—Douglas D. Watts
*Attorney, Agent, or Firm*—Bernard, Rothwell & Brown

[57] ABSTRACT

There are disclosed apparatus and method for transforming a moving, multiple layered bed of relatively thin pieces of solid material into a moving stream of the pieces having a considerably lesser number of layers of such pieces, preferably an essentially single layer. The multiple layered bed of pieces is moved on a first conveyor at a relatively slow speed toward the discharge end of the conveyor. At the discharge end of the conveyor the leading edge of the bed of pieces encounters a second conveyor which moves in the same general direction as the conveyor supporting the multiple layered bed of pieces but at least about 10 times greater speed. The second conveyor is disposed at an acute angle with respect to and above the first conveyor in a manner such that the lower or leading end of the second conveyor is positioned near the discharge end of the first conveyor. Projections from the second conveyor are preferably flexible projections which contact the leading edge of the bed and discharge the pieces from the bed as a stream having a height no more than the thickness of a few pieces overlying one another. The discharged pieces are taken away from the first and second conveyors fast enough to prevent undue, if any, overlapping of the discharged pieces. The method and apparatus may be used, for example, to transform a multiple layered bed of unfried potato based chips into a moving stream of chips having an essentially single layer for further treatment, e.g. by frying.

24 Claims, 4 Drawing Figures

U.S. Patent    Dec. 8, 1981    4,304,326
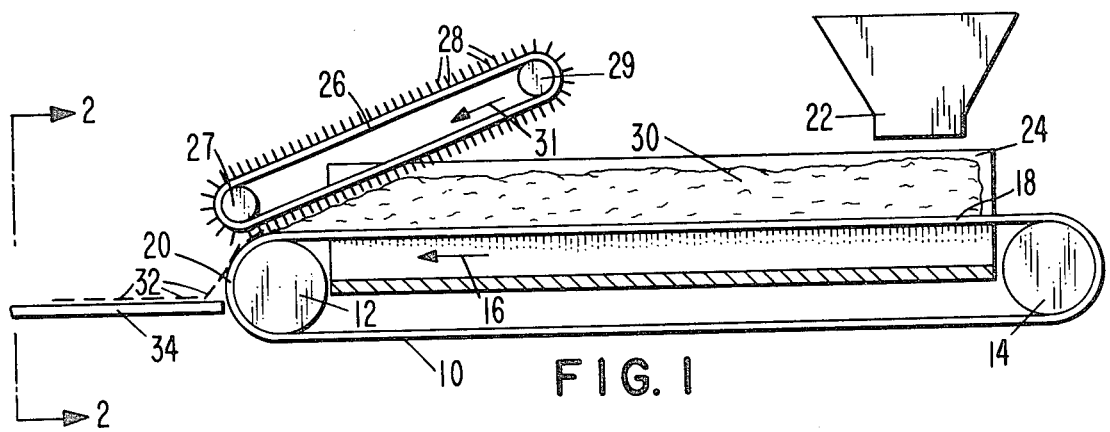
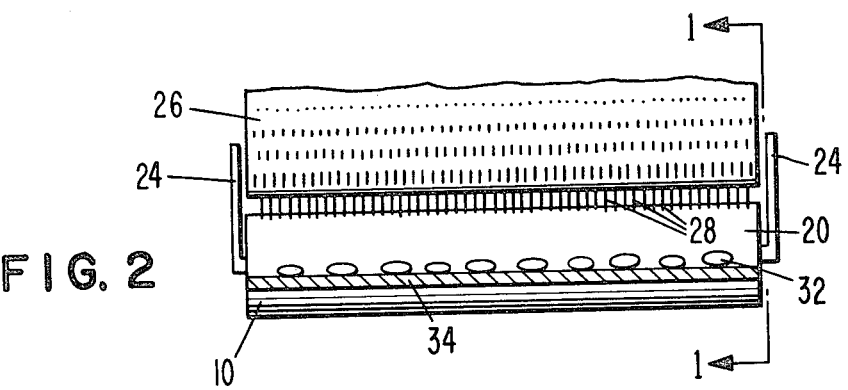
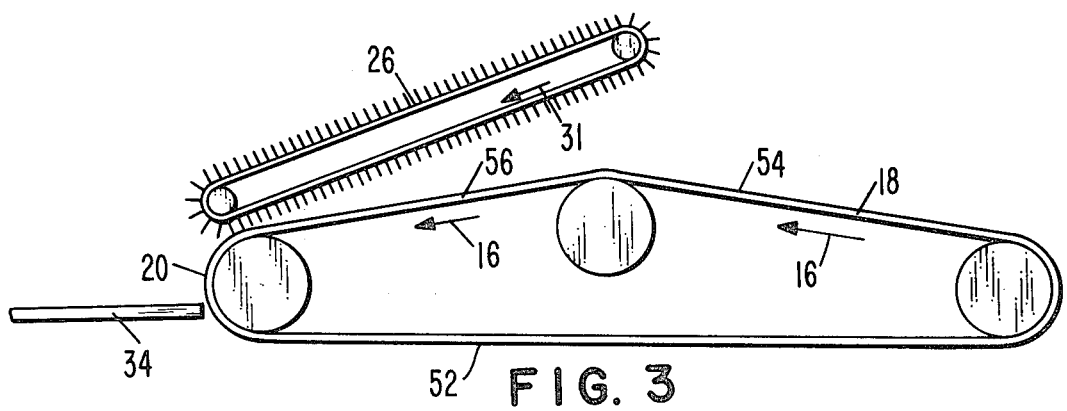
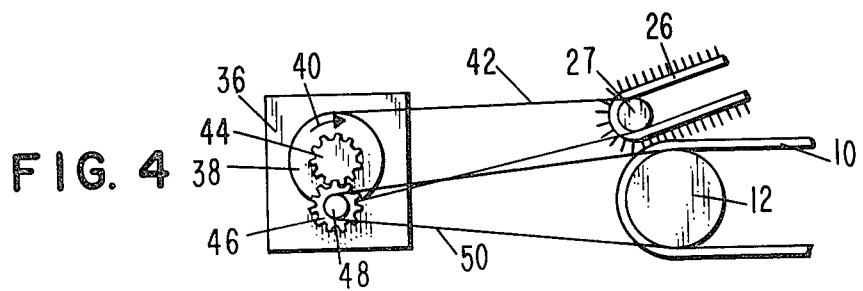

APPARATUS AND METHOD FOR TRANSFORMING A MULTIPLE LAYERED BED OF PIECES INTO A THINNER LAYER

This is a continuation of application Ser. No. 577,843, filed May 15, 1975.

The present invention pertains to the conveying and discharging of relatively thin pieces of solid material, e.g. uncooked potato based chips, from a multiple layered bed of the pieces. The invention serves to provide a discharge stream of these pieces having substantially less height than the initial bed, and preferably the resulting stream is essentially a single layer which may be discontinuous. This stream may be further processed as by, for instance, frying.

In various industrial operations it is desired to move thin materials available at a first location in a multiple layered bed to another location as a mass of considerably less height, e.g. an essentially single layer, for further processing. For instance, in the manufacture of potato chips, a dough may be made from potato solids, and the dough formed to the desired thickness. Relatively thin chips or pieces of the desired shape are cut from the dough, and the chips fried with or without intermediate drying. Often the unfried chips or pieces are placed in containers such as plastic bags for storage and/or shipment to other locations prior to frying. When the chips are to be fried, the container of unfried potato pieces is opened and the contents poured, such as in a random fashion, onto a conveyor. The resulting pile of potato pieces is fairly deep, constituting a substantially multiple layered bed of the potato chips in an overlying and overlapping relationship. However, at least during initial frying of the potato chips it is generally desired that they be stacked to a height of no more than the combined thickness of a few chips, and preferably they are in an essentially single layer. The uncooked potato chips are somewhat hard, dry and rough surfaced so that they have a relatively high coefficient of friction. They, thus, exhibit a strong reluctance to separate from each other and do not lend themselves well to feeding from the multiple layered bed to a lesser number of layers by belt or other conveyors. Consequently, providing the unfried potato chips for frying or other processing from a bulk multiple layered bed is difficult. Similar problems exist with the handling of other types of materials which are in the form of thin pieces.

The present invention relates to apparatus and method for transforming a moving, multipled-layered, essentially static bed of relatively thin pieces of solid material into a moving stream of the pieces having a considerably lesser number of layers of such pieces, preferably having an essentially single layer. The multiple layered bed of pieces is moved on a first conveyor at a relatively slow speed toward the discharge end of the conveyor. At the discharge end of the conveyor the leading edge of the bed of pieces encounters a second conveyor which moves in the same general direction as the conveyor supporting the multiple layered bed of pieces but at a substantially greater speed. The second conveyor is disposed at an acute angle with respect to and above the first conveyor in a manner such that the lower or leading end of the second conveyor is positioned near the discharge end of the first conveyor. Preferably the lower end of the second conveyor extends beyond the discharge end of the first conveyor in the general direction of travel of the conveyors. The second conveyor bears a large number of projections which are preferably flexible and which contact the leading edge of the bed and discharge the pieces from the bed as a stream having a height no more than the thickness of a few pieces overlying one another, and preferably the discharged stream is essentially a single layer of such pieces which may or may not be generally spaced apart. The discharged pieces are taken away from the first and second conveyors fast enough to prevent undue, if any, overlapping of the discharged pieces. The method and apparatus may be used, for example, to transform a multiple layered bed of unfried potato chips into a moving stream of chips having an essentially single layer for further treatment, e.g. by frying.

These and other aspects and advantages of the present invention may be more apparent from the following more detailed description, particularly when considered in conjunction with the accompanying drawings in which like parts bear like reference numerals.

In the drawings:

FIG. 1 is a side elevational section view of a first embodiment of the present invention and is generally taken along line 1—1 of FIG. 2;

FIG. 2 is a fragmentary, front elevational view of the embodiment of FIG. 1 and is generally taken along the line 2—2 of FIG. 1;

FIG. 3 is a side elevational section view depicting a modified embodiment of the present invention; and FIG. 4 is a fragmentary, side elevational view illustrating a manner of powering a conveyor made in accordance with the present invention.

Endless belt conveyor 10, depicted in FIG. 1, passes about rollers 12 and 14, one of which is driven by drive means not shown to move conveyor 10 in the direction shown by arrow 16 so that material placed on conveyor 10 moves generally to the left in FIG. 1 from inlet area 18 to discharge end 20. Conveyor 10 can be essentially horizontal or inclined to some extent upwardly or downwardly. If inclined upwardly in the direction of travel, the loading end is lowered which may facilitate loading of the material onto the conveyor. Conveyor 10 can be formed of any suitable material such as non-metallic belting or an open mesh or flat wire belting. Material can be deposited from containers upon inlet area 18 manually or, if desired, through means such as inlet hopper 22. Generally, this material is deposited on conveyor 10 as a static multiple layered bed 30 which has a large number of overlapping and overlying pieces of material extending over a substantial portion of the length and width of conveyor 10 as it moves the material from inlet area 18 to discharge end 20. This layer may have, for example, a thickness of about 100 or more times the thickness of the individual pieces, and the bed moves at essentially the same speed as conveyor 10. The bed may often have a thickness of greater than 15 centimeters. Preferably, as shown in FIG. 2, a side board 24 is provided on each side of conveyor 10 to assure that the material in bed 30 does not fall off the sides of the conveyor. Side boards 24, can of course, be of any desired height to provide the desired capacity on conveyor 10.

Conveyor 26 is positioned generally above conveyor 10 and its lower end is adjacent discharge end 20 of conveyor 10. Conveyor 26 is at an acute angle with respect to conveyor 10. This angle, which is essentially the angle of the leading edge of the bed on conveyor 10, as taken at the bite of the two conveyors, i.e. between the discharge end of conveyor 10 and the lower end of conveyor 26, is usually less than about 45°, and the operation improves with respect to the uniformity of discharge of the pieces of the material and the thinness of the discharged layer as the angle decreases. The loading capacity of conveyor 10, however, generally decreases for given lengths of the conveyors as this angle becomes smaller. It is preferred that the angle be less than about 35° and generally it is at least about 10°, most preferably less than 10°. The lower end of conveyor 26 is preferably approximately above or in front of the discharge end of conveyor 10 in the general direction of travel of the latter.

As illustrated in FIG. 1, conveyor 26 is shown in the form of a second endless belt which passes about rollers 27 and 29, one of which is powered by means not shown, to move the lower surface of conveyor 26, adjacent conveyor 10, in the same general direction as conveyor 10 and as indicated by arrow 31. Conveyor 26 can be made of non-metallic belting or other suitable material and is preferably flexible. A large number of projections or fingers 28 extend from and may substantially cover the outer surface of conveyor 26, and especially when the materials conveyed are fragile, as is the case with potato or other farinaceous chips, it is advantageous that the projections be flexible. The projections can thus be made from rubber or other elastomeric materials. The spacing of the projections 28 on conveyor 26 can be non-uniform or uniform as in a lined or staggered arrangement. For example, the projections may be about 3 to 20 or more millimeters tall and on about 3 to 20 or more millimeter centers. In a particular case they were about 10 millimeters tall on 10 millimeter centers and were carried by a belt about 3 millimeters thick. The latter conveyor belt is preferably quite flexible and may fit loosely or flippingly on its rollers.

Conveyor 26 moves at a speed considerably greater than the speed of conveyor 10. The speed of conveyor 26 is generally at least about ten times greater than the speed of conveyor 10, and this rate may be sixty or more times greater. The speed of conveyor 10 may be, for example, about 3 to 60 centimeters per minute, preferably about 15 to 30 centimeters per minute, and the speed of the conveyor 26 is preferably about thirty to fifty times greater. If the speed of conveyor 26 is too fast, the material 30 may be damaged.

As the multiple layered bed 30 of material is carried by conveyor 10 toward discharge end 20, fingers 28 contact the leading edge of the bed to cause pieces of the material to leave discharge end 20 of conveyor 10 at a rate such that they pass between the bite of the conveyors as a substantially thinner layer than they are disposed on conveyor 10. The rate of discharge of the pieces from the bed may be at approximately the same speed as conveyor 26, but this discharge may be at a somewhat slower speed when conveyor 26 slips past the leading edge of the bed of pieces to some extent. The thickness of this discharge stream may depend upon the speed of the conveyors and their relative speeds, as well as the angle and the extent of the opening between the conveyors at the discharge end. The smaller this opening, the greater the tendency to form a thinner discharge stream, and the opening is at least sufficient to permit passage of a single layer of the pieces being conveyed. The outward ends of fingers 28 may actually touch conveyor belt 10, and this contributes to the discharge of the pieces as a single layer. These variables are controlled to provide a discharge stream of the pieces which has a height substantially less than that of the bed on conveyor 10, e.g. less than about one-tenth as high. The height of the stream of discharged pieces is preferably no more than the thickness of a few, e.g. no more than about five or ten, of the thin pieces being conveyed. The discharged stream may thus be composed of overlapping pieces, but it is preferred that the stream be discharged as a compact, essentially single layer of the pieces. This single layer may, however, have the pieces spaced apart, if desired but this reduces the amount of pieces discharged during a given period of time.

The discharged pieces 32 drop onto a moving receiver 34. The latter may be any suitable device, such as a belt conveyor, moving at a speed sufficient to take the pieces away from the discharge end of conveyor 10 fast enough to keep the pieces from forming a layer of undesired height on receiver 34.

As seen in FIG. 2, conveyor 26 is preferably of substantially the same width as conveyor 10. In the form of the invention depicted in FIG. 1 in which conveyor 26 takes the form of an endless belt, the latter is preferably oriented so that its longitudinal axis is at an angle of less than about 35° with respect to the longitudinal axis of conveyor 10, as described above. The fingers 28 adjacent discharge end 20 of conveyor 10 thus pass about roller 27 and so are moving in the same relative lineal or horizontally-vectored direction as is multiple layered bed 30; that is, as conveyor 10 moves multiple layered bed 30 to the left in FIG. 1 at a first speed, fingers 28 cause the pieces being conveyed to leave bed 30 in the same relative lineal direction, i.e., to the left in FIG. 1, and at a speed much greater than the speed of conveyor 10 so that the pieces discharge from conveyor 10 onto moving receiver 34 in the desired thickness. Receiver 34 may be, for example, a belt conveyor for delivering the dispensed material to another location. Thus receiver 34 may serve to take unfried potato chips to a fryer, or receiver 34 might be the fryer itself and having means for moving the chips away from its inlet end at the desired rate.

To increase the capacity of the conveyor which holds the multiple layered bed of pieces, that conveyor can be an angled conveyor as depicted, for example, in FIG. 3. As there illustrated, conveyor 52 includes a first portion 54 angled upwardly in the direction of travel from inlet area 18 to second portion 56 which is angled downwardly. Second conveyor 26 is positioned so that it moves in the direction and provides a bite adjacent discharge end 20 of conveyor 52, as described above with reference to the embodiment of FIGS. 1 and 2, and, likewise, receiver 34 is adjacent discharge end 20 to receive and remove the discharged stream therefrom. Conveyors 52 and 26 can thus be oriented with a small angle between them to provide a thin discharge stream, and yet the downward angling of first portion 54 provides a higher capacity for conveyor 52. Generally, first portion 54 is angled relative to second conveyor 26 at an acute angle greater than the acute angle at the discharge end bite of conveyor portion 56.

Preferably, conveyor 10 is powered by a variable speed source to accommodate various rates of receipt of material at inlet area 18. FIG. 4 illustrates a method of powering the present invention which provides a fixed speed ratio between conveyor 10 and conveyor 26. As shown in FIG. 4, a drive source 36 drives pulley 38 at a first speed. Pulley 38 rotates clockwise in FIG. 4, as indicated by arrow 40. Drive belt 42 couples pulley 38 with drive roller 27 of conveyor 26. Gear 44 is coupled to pulley 38 and drives gear 46 which, in turn, is coupled to pulley 48. Drive belt 50 couples pulley 48 with drive roller 12 of conveyor 10. The diameters of pulley 38, pulley 48, drive roller 12, drive roller 27, gear 44, and gear 46 determine the speed ratio between conveyor 10 and conveyor 26. Drive source 36 can be adjusted to adjust the speeds of the conveyors while maintaining the same speed ratio. Gears 44 and 46 assure that the proper direction of movement is obtained from conveyor 10 and conveyor 26 from this single drive source 36.

The conveyor system of the present invention has been found to provide a uniform discharge rate of thin, flat, dry material, such as farinaceous chips, including unfried potato chips, which otherwise tend to interleaf or interlock and have little tendency to flow. The materials have principal surface dimensions which are much greater than their thickness, e.g. more than about ten times greater. For example, the materials may have a thickness of less than one-tenth inch and principle surface dimensions of at least about one inch. In a particular case unfried potato chips where successfully handled and distributed by the device of the invention when the chips were about 0.06 centimeters in thickness and had a diameter of about 5 centimeters. The device is mechanically simple and can be used with a wide variety of relatively thin materials which may or may not tend to cluster together, and even where gentle handling is required. The invention is particularly advantageous when used to convey and distribute materials that have a high angle of repose and whose surfaces are rough and exhibit substantial friction. If the materials conveyed are fragile or delicate, little product breakage is experienced due to the relatively slow movement of conveyor 10 and the gentle action of conveyor 26. Unfried potato chips are an example of such materials. These chips may have at least about five percent moisture and be composed of raw, partially cooked, or dried potatoes or combinations thereof. The moisture content may often be up to about fifty weight percent, preferably up to about twenty-five weight percent. The apparatus is relatively light weight and can be caster mounted for mobility, if desired.

Although the present invention has been described with reference to preferred embodiments, numerous modifications and rearrangements could be made, and still the result would come within the scope of the invention.

What is claimed is:

1. Apparatus for conveying and transforming a multiple layered bed of relatively thin, fragile pieces of farinaceous dough into a substantially thinner layer, wherein said bed has a leading edge, comprising:
    first conveying means for holding said bed of dough pieces and moving said bed of dough pieces in a direction at a first speed, said first conveying means having a discharge end;
    second conveying means overlying and at acute angle to said first conveying means with the lower end of said second conveying means being adjacent said first conveying means discharge end, wherein said second conveying means comprising an endless conveyor having a plurality of flexible fingers projecting therefrom; and
    means for moving said second conveying means in the same general direction as said first conveying means and at a speed of at least about ten times greater than the speed of said first conveying means, said flexible fingers being adapted for engaging said leading edge to remove said dough pieces from along substantially the entire length of said leading edge of the multiple layered bed and moving said removed dough pieces through said discharge end to form a substantially thinner layer than in said bed, and maintaining at least a majority of said dough pieces, before and during movement from said multiple layered bed to said thinner layer, substantially unbroken.

2. Apparatus as claimed in claim 1 further comprising means for receiving said dough pieces removed from the multiple layered bed and conveying them from said discharge end in a substantially thinner layer than in said bed.

3. Apparatus as claimed in claim 1 in which said means for moving moves said second conveying means at a speed of from about thirty to about fifty times as great as the speed of said first conveying means.

4. Apparatus as claimed in claim 1 in which said first conveying means is an endless belt conveyor.

5. Apparatus as claimed in claim 1 in which said first conveying means moves at a speed in the range of from about 15 to 30 centimeters per minute.

6. Apparatus as claimed in claim 1 in which said means for moving comprises drive means, first coupling means coupling said drive means with said first conveying means for actuating said first conveying means to move at a first speed, and second coupling means coupling said drive means with said second conveying means for moving said second conveying means at a second speed, the second speed being a fixed multiple of the first speed.

7. Apparatus as claimed in claim 1 in which:
    said first conveying means comprises a first endless belt conveyor;
    said second conveying means comprises a second endless belt conveyor; and
    said means for moving moves said second conveying means to move said dough pieces at a speed in the range of from about ten to about fifty times as great as the speed of movement of said bed.

8. Apparatus as claimed in claim 7 in which said first conveying means moves at a speed in the range of from about 15 to 30 centimeters per minute.

9. Apparatus as claimed in claim 1 in which said first conveying means is an angled endless belt conveyor having a first conveying portion and a second conveying portion, said second portion being adjacent said discharge end and being beneath and at a first acute angle to said second conveying means, said first portion being angled with respect to said second portion to be at a second acute angle to said second conveying means, said second acute angle being greater than said first acute angle.

10. Apparatus as claimed in claim 1 in which said acute angle is an angle of at least about 10°.

11. Apparatus as claimed in claim 10 in which said acute angle is less than about 35°.

12. A method of conveying and transforming a multiple layered bed of relatively thin, fragile pieces of farinaceous dough into a substantially thinner layer comprising:
    positioning said pieces of dough in a multiple layered bed;

conveying the multiple layered bed having a leading edge in a first direction on a first conveyor;

contacting the leading edge of said bed of pieces on said first conveyor with a second conveyor overlying said first conveyor and moving at speed at least about ten times greater than the speed of said first conveyor and in the same direction as the movement of said first conveyor, the line of contact between said second conveyor and the leading edge of said bed being at an acute angle with respect to the discharge end of said first conveyor, said leading edge being adjacent the discharge end of said first conveyor, in which said contact of the leading edge of said bed is made by flexible projections on said second conveyor;

removing from along substantially the entire length of said leading edge pieces of said multiple layered bed; and discharging said pieces removed from said leading edge at the discharge end of said first conveyor as a substantially thinner layer than said bed while maintaining said pieces removed, before and during movement from said multiple layered bed to said thinner layer, substantially unbroken.

13. A method as claimed in claim 12 further comprising removing said substantially thinner layer of pieces away from the discharge end of said first conveyor.

14. A method as claimed in claim 12 in which said substantially thinner layer is an essentially single layer.

15. A method as claimed in claim 12 in which said bed is conveyed at a speed in the range of from about 15 to 30 centimeters per minute.

16. A method as claimed in claim 12 in which:
said bed is conveyed at a first speed in the range of from about 15 to 30 centimeters per minute; and
said second conveyor moves at a speed of about thirty to fifty times greater than the first speed.

17. A method as claimed in claim 12 in which said acute angle is at least about 10°.

18. A method as claimed in claim 17 in which said acute angle is less than about 35°.

19. A method as claimed in claim 12 in which said thinner layer is less than about one-tenth the height of said bed of pieces.

20. A method as claimed in claim 19 in which said thinner layer is essentially a single layer of said pieces.

21. A method of conveying and transforming a multiple layered bed of relatively thin, fragile pieces of farinaceous dough into a substantially thinner layer comprising:
positioning said pieces of farinaceous dough material in a multiple layered bed;
conveying the multiple layered bed in a first direction on a first conveyor;
contacting the leading edge of said bed of farinaceous dough pieces on said first conveyor with a second conveyor overlying said first conveyor and moving at a substantially greater speed than the speed of said first conveyor and in the same direction as the movement of said first conveyor, the line of contact between said second conveyor and the leading edge of said bed being at an acute angle with respect to the discharge end of said first conveyor, said leading edge being adjacent the discharge end of said first conveyor, and said second conveyor having a plurality of flexible projections extending outwardly therefrom for making said contact with the leading edge of said bed;

removing from along substantially the entire length of said leading edge farinaceous dough pieces of said multilayered bed; and discharging said farinaceous dough pieces removed from said leading edge at the discharge end of said first conveyor as a substantially thinner layer having less than about one-tenth the height of said bed while maintaining said farinaceous dough pieces before and during movement from said multilayered bed to said thinner layer, substantially unbroken.

22. A method as claimed in claim 21 in which said thinner layer is an essentially single layer.

23. Apparatus for conveying and transforming a multiple layered bed of relatively thin pieces of farinaceous dough into a substantially thinner layer, wherein said bed has at least a leading edge, comprising:
(a) a first endless belt conveyor for holding said bed of dough pieces and moving said bed in a direction at a first speed, said first conveyor further including a discharge end;
(b) a second endless belt conveyor overlying said first conveyor at an acute angle thereto, said second conveyor having a lower end adjacent said discharge end of said first conveyor;
(c) said second conveyor having flexible fingers extending therefrom for contacting said dough pieces on the leading edge; and
(d) drive means for moving said second conveyor in substantially the same direction as said first conveyor and at a speed substantially greater than that of said first conveyor, with said flexible fingers being adapted for engaging said leading edge to remove said dough pieces from along substantially the entire length of said leading edge of said multiple layered bed, and moving said removed pieces through said discharge end to form a substantially thinner layer than in said bed while maintaining at least a majority of said dough pieces, before and during movement from said multiple layered bed to said thinner layer, substantially unbroken.

24. Apparatus as claimed in claim 24 in which said first conveyor is an angled endless belt conveyor having a first conveying portion and a second conveying portion, said second portion being adjacent said discharge end and being beneath and at a first acute angle to said second conveyor, said first portion being angled with respect to said second portion to be at a second acute angle to said second conveyor, said second acute angle being greater than said first acute angle.

* * * * *